Aug. 16, 1949.　　　　R. V. ANDERSON　　　　2,479,197
SUBMERGED MELT WELDING FIXTURE
Filed April 5, 1946　　　　　　　　　　　2 Sheets-Sheet 1
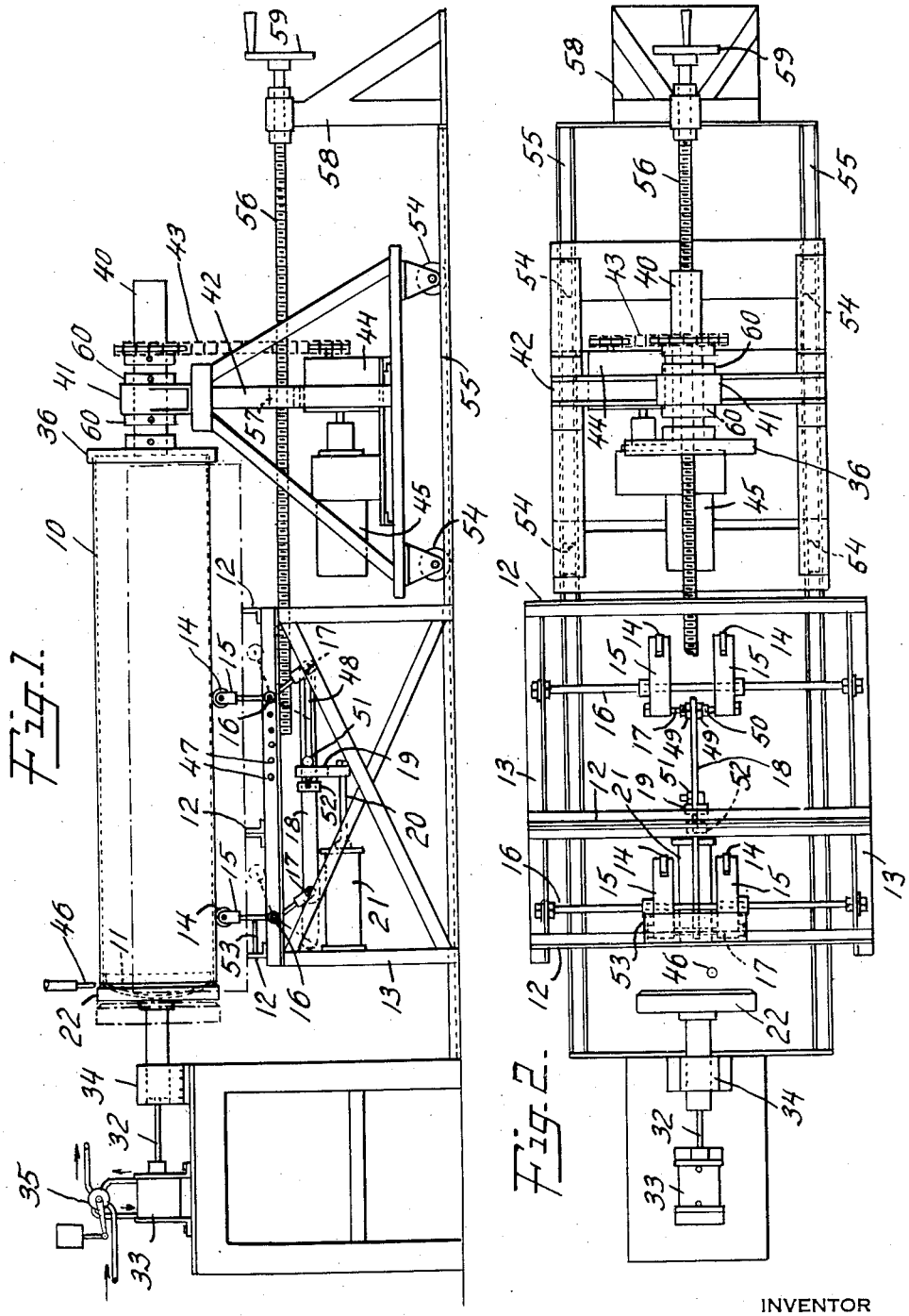
INVENTOR
REA V. ANDERSON
BY
Pennie, Edmonds, Morton and Barrows
ATTORNEYS Aug. 16, 1949.      R. V. ANDERSON      2,479,197
SUBMERGED MELT WELDING FIXTURE
Filed April 5, 1946     2 Sheets—Sheet 2
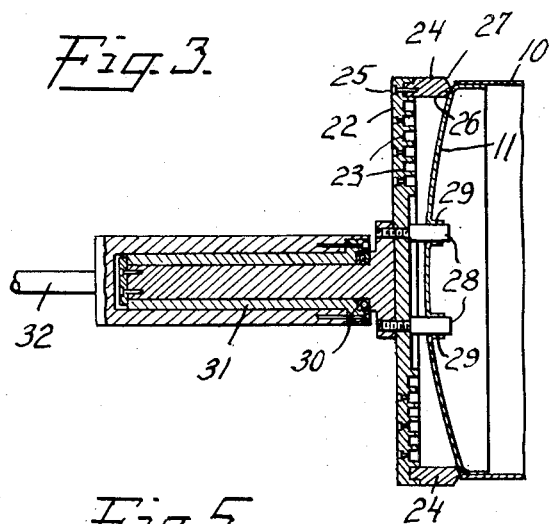
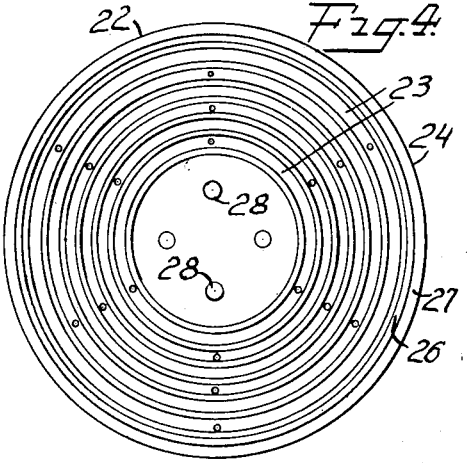
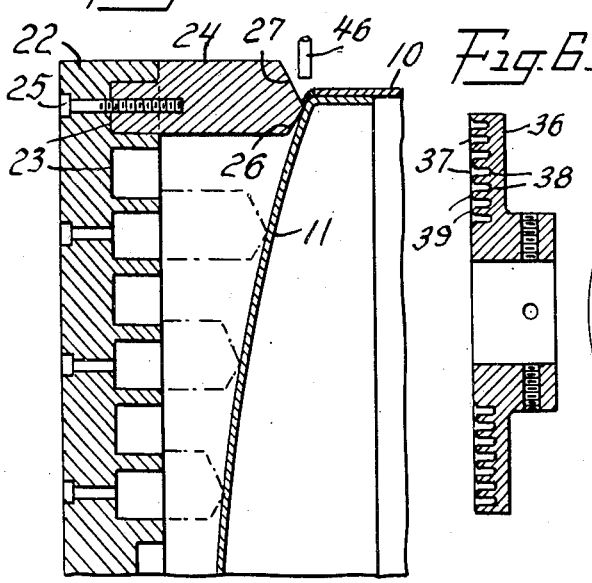
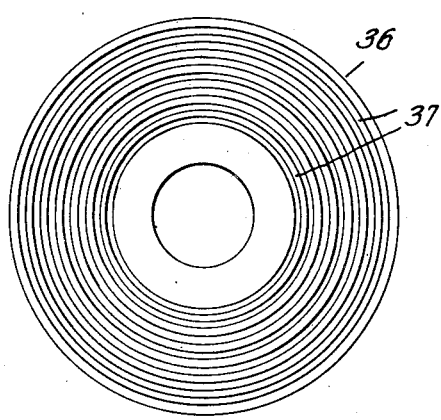
INVENTOR
REA V. ANDERSON
BY
Pennie, Edmonds, Morton and Barrows
ATTORNEYS Patented Aug. 16, 1949

2,479,197

UNITED STATES PATENT OFFICE 2,479,197

SUBMERGED MELT WELDING FIXTURE

Rea V. Anderson, Los Angeles, Calif., assignor to Rheem Manufacturing Company, Richmond, Calif., a company of California Application April 5, 1946, Serial No. 659,751

1 Claim. (Cl. 219—17)

This invention relates to welding fixtures and, more particularly, to a welding fixture adapted to support a cylindrical shell during welding thereto of an end closure member or head.

In the construction of welded containers such as water tanks and the like, it is conventional practice to fit one end of a cylindrical shell with an end closure member or head either of concave or convex shape. The head is generally provided with a peripheral flange of such size as to fit snugly within the end of the shell. The peripheral flange can be welded to the end of a shell 12 inches in diameter in about 30 seconds by modern submerged melt welding technique. The welding technique has advanced more rapidly than the development of fixtures to hold and move the work to be welded, and it is, accordingly, the object of the present invention to provide a work-holding fixture capable of adapting modern welding technique to the mass production of welded containers.

The welding fixture of the invention is adapted to support a cylindrical shell assembly having an end closure member mounted at one end thereof and is adapted to rotate the shell about its axis during welding of the periphery of the closure member to the shell. The fixture comprises driving means adapted to support the opposite end of the shell and to rotate the shell assembly during the welding operation. Positioning means is provided which is adapted to place the shell in position for engagement with the driving means and means are provided for moving the shell thus positioned into engagement with the driving means. The means for moving the shell into engagement with the driving means includes a supporting structure adapted to support the end of the shell assembly adjacent the end closure member and is further adapted to provide support for the granular flux used in submerged melt welding of the closure member to the shell.

The foregoing and other novel features of the welding fixture of the invention will be more fully understood from the following description taken in conjunction with the accompanying drawings, in which Fig. 1 is a side elevation of the welding fixture;

Fig. 2 is a plan view of the welding fixture;

Fig. 3 is a side view in section of the supporting means for the end closure member of the shell assembly;

Fig. 4 is an end view of the supporting means shown in Fig. 3;

Fig. 5 is a detailed partial section of the supporting means shown in Fig. 3;

Fig. 6 is a side view in section of the driving means supporting the other end of the shell assembly; and Fig. 7 is an end view of the driving means shown in Fig. 6.

The welding fixture of the invention is adapted to handle a cylindrical shell assembly comprising a shell 10 and an end closure member or head 11 mounted at one end of the shell. The shell assembly is supported on rails, such as angle irons 12, mounted on a main frame 13. The shell assembly, supported by the angle irons 12 in conveyor-like manner, is rolled into a position directly above two pairs of rollers 14 of an elevating or positioning mechanism. In the positioning mechanism shown in the drawings, the rollers 14 are supported in the uppermost end of each of two pairs of rocker arms 15. The central portion of each rocker arm is pivotally mounted on a shaft 16 supported by main frame 13. The lowermost ends of each pair of rocker arms are connected by a shaft 17. The two shafts 17 are engaged by the ends of a connecting arm 18 which is adapted to be moved by a yoke 19 mounted on a reciprocating shaft 20 of a hydraulic cylinder 21. Movement of the reciprocating shaft 20 moves the cross arm 17 so as either to raise or lower the rollers 14 with respect to the level of the tracks (angle irons) 12. With a shell assembly placed directly over the rollers 14, raising of the rollers raises the shell assembly into axial alignment with a supporting member for each end of the shell assembly.

One of these supporting members (Figs. 3, 4 and 5) is adapted to engage the head of the shell assembly. It comprises a disc-shaped member 22 having a plurality of annular grooves 23 in one of which an annular ring 24 is removably secured by screws 25, or the like. The exposed side of the annular ring is provided with an inwardly sloping beveled surface 26 adapted to engage the convex surface of the head 11 of the shell assembly. The rest of this same exposed side of the annular ring, that is, surface 27, is adapted to project radially outwardly beyond the periphery of the flange of the head 11, so as to provide support for a mass of granular flux for submerged melt welding at the periphery of the flange. Surface 27 is advantageously flared or beveled backwardly for this purpose.

The central portion of the disc-shaped member 22 is provided with one or more pins 28 (two being shown in the drawing) adapted to engage fitting openings 29 in the head 11. The pin engaging each fitting opening serves to align the supporting member, including the annular ring 24, with the face of the head 11. The disc-shaped member 22 is mounted by means of a thrust bearing 30, on a hub 31. The hub 31 is mounted on the end of a reciprocating shaft 32 of a hydraulic cylinder (see Fig. 1) 33. Lateral movement of the head-supporting member, in response to movement of the reciprocating shaft 32, is facilitated by the guiding sleeve 34 in which the hub 31 is mounted. Movement of the shaft 32, and hence the head-supporting member, is controlled by the solenoid operated valve 35, which regulates the flow of hydraulic fluid to the cylinder 33. When the valve 35 is opened, the reciprocating shaft 32 is moved outwardly to force the annular ring 24 of the head-supporting member into contact with the head 11 of the shell assembly. Further movement of the reciprocating shaft in the same direction moves the shell assembly into engagement with the driving and supporting means at the other end of the assembly.

This driving and supporting means (Figs. 6 and 7) comprises a rotatable disc 36. The face of the disc is provided with a plurality of concentric annular grooves 37 of appropriate diameter to engage the ends of shells of different pre-determined diameters. The base of each groove is radiused, as shown at 38, so as to permit wedging contact between the groove and the end of the shell 10. The shoulders 39 between adjacent grooves are also radiused to facilitate seating of the end of the shell in its appropriate groove. The rotatable disc 36 is supported on a shaft 40 (see Figs. 1 and 2) which is mounted in a bearing 41 atop a supporting frame 42. The shaft 40 is driven by suitable means such as a chain 43 driven through a variable speed reducer 44 by a motor 45 mounted within the frame 42.

In operation of the welding fixture of the invention, a cylindrical shell assembly comprising a shell 10 having an end closure member 11 mounted at one end thereof is rolled along the angle irons 12 until placed directly over the rollers 14. The hydraulic cylinder 21 is then operated to pivot the rocker arms 15 and thus raise the shell assembly into position for engagement by the supporting elements at each end of the shell. In this raised position the shell assembly is aligned with the axially aligned annular ring 24 at the head end of the assembly and the driving disc 36 at the other end of the assembly. With the shell assembly thus positioned, the solenoid operated valve 35 is operated to move the reciprocating shaft 32 outwardly so as to force the annular ring 24 into contact with the surface of the head 11 and further to move the entire shell assembly on rollers 14 until the opposite end of the shell engages its appropriate groove in the driving disc 36. The rollers 14 are then preferably lowered to permit free rotation of the shell assembly by the driving disc 36. The welding electrode 46, submerged in a granular flux for submerged melt welding, is then put into operation to weld the periphery of the flange of the head member 11 to the end of the shell 10. The body of flux is supported on the flange of the head 11 by the sloping surface 27 of the annular ring 24, the ring being maintained in perfect alignment with the head 11 by means of the pins 28 engaging the fitting openings 29 in the head 11. When the welding has been completed around the full periphery of the head 11, the reciprocating shaft 32 is caused to recede and draw the annular ring 23 away from the head of the shell assembly. The rollers 14 are simultaneously raised to receive the shell assembly and are then lowered to return the assembly to the angle irons 12 along which the assembly may be rolled to the next stage in its fabrication.

Each of the operating units of the welding fixture is provided with adjustments adapted to accommodate shell assemblies of different diameters and lengths. For example, the positioning or elevating mechanism is adapted to accommodate shell assemblies over a wide range of lengths. To accomplish this result, a series of appropriately spaced openings 47 are provided in the frame 13 to hold one of the shafts 16 supporting one pair of rocker arms 15. By mounting the shaft in the appropriate openings in the frame, the position of one pair of rocker arms can be brought closer to or further away from the other pair of rocker arms and thus handle shell assemblies of different lengths. The cross-arm 17 is provided with a corresponding sliding adjustment such as a slot 48 in which the lower end of this pair of rocker arms is adjustably secured by locking nuts 49 on a threaded sleeve 50. In this way, the rocker arm can be maintained in alignment. The extent to which the rocker arms are raised by the throw of the hydraulic cylinder 21 can be adjusted by the position of a bolt 51 slidably mounted in the cross-arm slot 48. A collar 52 insures retraction of the rocker arm when the plunger of the hydraulic cylinder 21 is retracted, and a stop 53 limits the upward movement of the rocker arms to a substantially vertical position.

The disc-shaped member 22 of the head-supporting member is also provided with means for adjustment to accommodate heads of different shapes and sizes. Thus, a plurality of concentric recesses 23 is provided in the disc-shaped member 22 so that annular rings 24 of appropriate diameter may be mounted for engagement with heads of pre-determined size, these alternate rings 24 being shown by the dotted lines in Fig. 5. The shape of the exposed face of the annular ring may be inwardly beveled as shown in the drawing to accommodate a convex shaped head, and another ring of the same diameter but with an outwardly beveled edge is provided with advantage for engagement with concave-shaped heads.

The position of the driving disc 36 may also be altered to accommodate shell assemblies of different lengths. This is accomplished by mounting the supporting frame 42 on wheels 54 riding in tracks 55 so that the supporting frame can be moved toward or away from the head-supporting member. The position of the supporting frame 42 is established and maintained by a threaded shaft 56 extending through a threaded bushing 57 in the supporting frame 42 and mounted in a fixed end frame 58. The end of the shaft is provided with a hand wheel 59 so that by rotation of the shaft 56 the position of the supporting frame 42 with its driving disc 36 may be established to engage the end of a shell assembly of any overall length. It will be noted in Fig. 2 that the width of the movable supporting frame 42 is less than that of main frame 13. This permits movement of the frame 42 partially under frame 13 to accommodate short shell assemblies. And in order to permit still greater flexibility, the shaft 40 supporting the driving disc 36 is elongated and is keyed to the bearing 41 by locking collars 60 so as to provide additional length of movement of the driving disc 36 for extremely short or long shells.

It will be seen, therefore, that the novel welding fixture of the present invention provides means for handling a cylindrical shell assembly with a deftness commensurate with the speed of modern submerged melt welding. The welding fixture is characterized by exceptional versatility in handling shell assemblies of any of a wide variety of diameters and lengths. Moreover, although the fixture has been described in conjunction with submerged melt welding, it may be used with advantage with any type of welding adapted to provide a suitable weld between a cylindrical shell and its end closure member.

I claim:

A submerged melt welding fixture adapted to support a cylindrical shell assembly having an end closure member mounted at one end thereof and to rotate the shell about its axis during submerged melt welding of the periphery of said closure member to the shell, comprising a disc-shaped rotatable driving member having an annular recess adapted to engage and support the opposite end of the shell and thus rotate the shell assembly, positioning means adapted to place the shell in position for engagement with the driving member, a supporting member adapted to engage and support the shell assembly adjacent the end closure member, the supporting member comprising a frame and an annular ring mounted in the frame, the ring being adapted to engage the surface of said end closure member adjacent the periphery thereof and to extend radially outwardly beyond said periphery to provide a support for a body of granular flux adjacent the periphery of said end closure member during the submerged melt welding operation, means for aligning the supporting member with the shell assembly, and means associated with said supporting member adapted to move the positioned shell into engagement with the driving means.

REA V. ANDERSON.

REFERENCES CITED

The following references are of record in the file of this patent:

UNITED STATES PATENTS

| Number | Name | Date |
| --- | --- | --- |
| 164,232 | Tandy | June 8, 1875 |
| 234,271 | Gornall | Nov. 9, 1880 |
| 1,035,254 | Smith | Aug. 13, 1912 |
| 1,713,625 | Rhodes | May 21, 1929 |
| 1,904,913 | Adams | Apr. 18, 1933 |
| 1,907,702 | Anderson | May 9, 1933 |
| 2,004,816 | Lindgren | June 11, 1935 |
| 2,020,830 | Gray | Nov. 12, 1935 |
| 2,145,009 | Keir | Jan. 24, 1939 |
| 2,256,879 | Cornell | Sept. 23, 1941 |
| 2,303,720 | Berkeley | Dec. 1, 1942 |
| 2,349,865 | Hawk et al. | May 30, 1944 |
| 2,434,321 | Kleiner et al. | Jan. 13, 1948 |